(12) United States Patent
Nelson

(10) Patent No.: US 7,944,689 B2
(45) Date of Patent: May 17, 2011

(54) COSMETIC COMPUTER

(76) Inventor: Jinette Mary Sulzbach Nelson, Pensacola, FL (US)

( * ) Notice: Subject to any disclaimer, the term of this patent is extended or adjusted under 35 U.S.C. 154(b) by 0 days.

(21) Appl. No.: 12/230,559

(22) Filed: Sep. 2, 2008

(65) Prior Publication Data

US 2010/0053864 A1    Mar. 4, 2010

(51) Int. Cl.
*H05K 5/00* (2006.01)
*H05K 7/00* (2006.01)
*A45D 40/26* (2006.01)

(52) U.S. Cl. ......... 361/679.55; 361/679.26; 361/679.27; 132/218

(58) Field of Classification Search ............. 361/679.02, 361/679.21, 679.22, 679.26, 679.27, 679.55; 455/347; 132/218, 287
See application file for complete search history.

(56) References Cited

U.S. PATENT DOCUMENTS 6,768,634 B2 * 7/2004 Kim ........................ 361/679.09
7,440,269 B2 * 10/2008 Liao et al. ................ 361/679.55
* cited by examiner

*Primary Examiner* — Jayprakash N Gandhi
*Assistant Examiner* — Anthony M Haughton

(57) ABSTRACT

This laptop apparatus is built not only with a computer but also with a cosmetic compact. It is complete with makeup and can be matched with any skin type. The compact is mounted at the top of the laptop for easy and quick access. What's so great about this laptop is that it makes traveling a breeze and is fashion forward. Not only can you surf the net, catch up with work, but you can look great doing it.

5 Claims, 3 Drawing Sheets

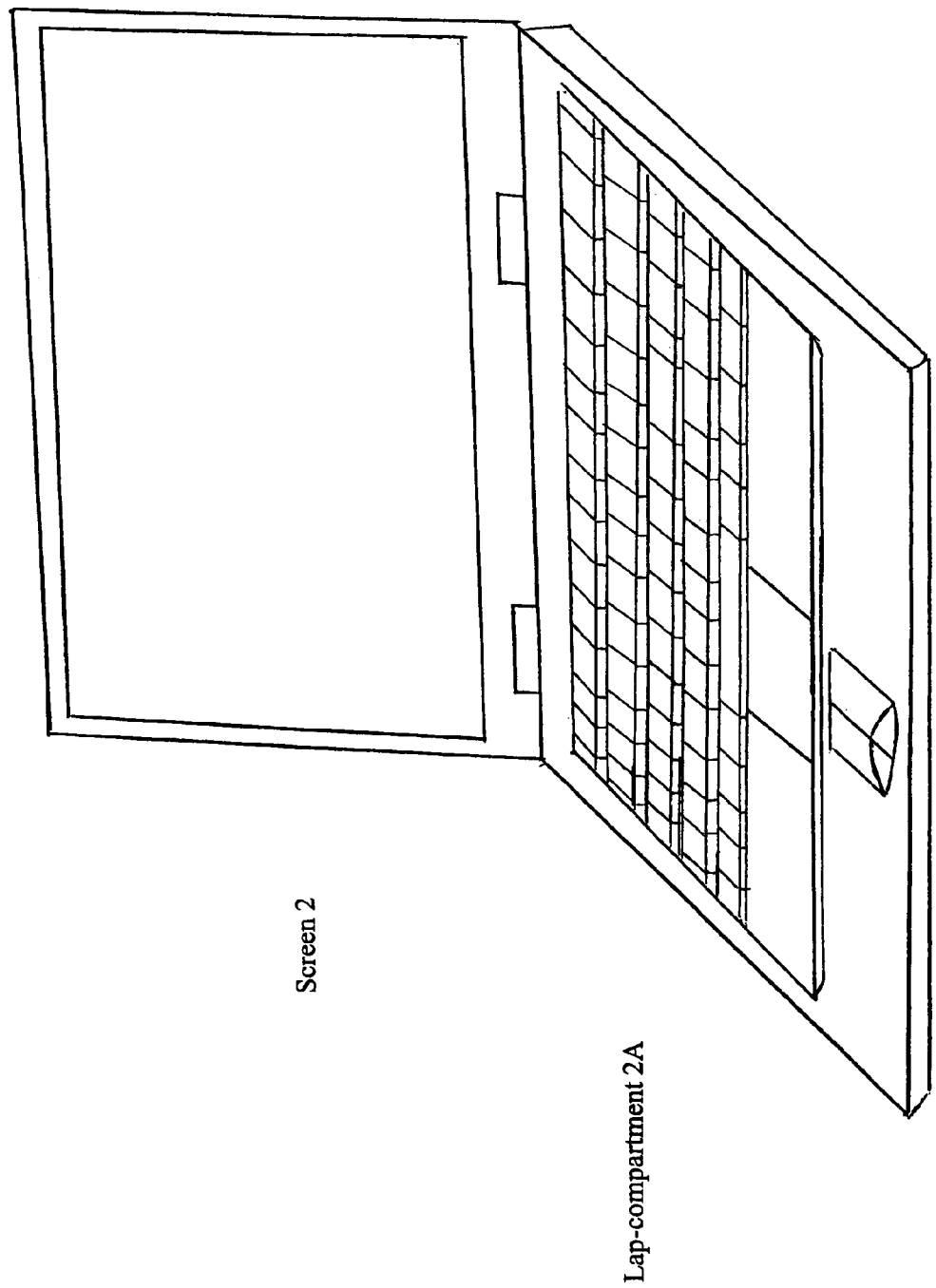

COSMETIC COMPUTER

BACKGROUND OF THE INVENTION

This invention relates to the field of computer technology and the makeup industry. To be more specific it relates to the field of storing and dispensing makeup from a separate compartment in the laptop. The problem that is being solved with this is that instead of having the two separated; combine the two so it becomes convenient to have both. This process is very easy and because of this it is less time consuming to reach one or the other in a time of need.

BRIEF SUMMERY OF THE INVENTION

This is a laptop computer with a built in cosmetic tray. It is complete with makeup and can be matched with any skin type. It's preferential to the person who owns this part compute part cosmetic kit.

BRIEF DESCRIPTION OF SEVERAL VIEWS OF THE DRAWING

Our Utility Patent includes three drawings; FIG. 1, FIG. 2, and FIG. 3. The three drawings will show the user the three positions of the laptop.

FIG. 1, shows the first compartment.

FIG. 2 shows the laptop transforming from FIG. 1 to FIG. 3. FIG. 2 is the process in witch this happens.

DETAILED DESCRIPTION OF THE INVENTION

Figure 1:
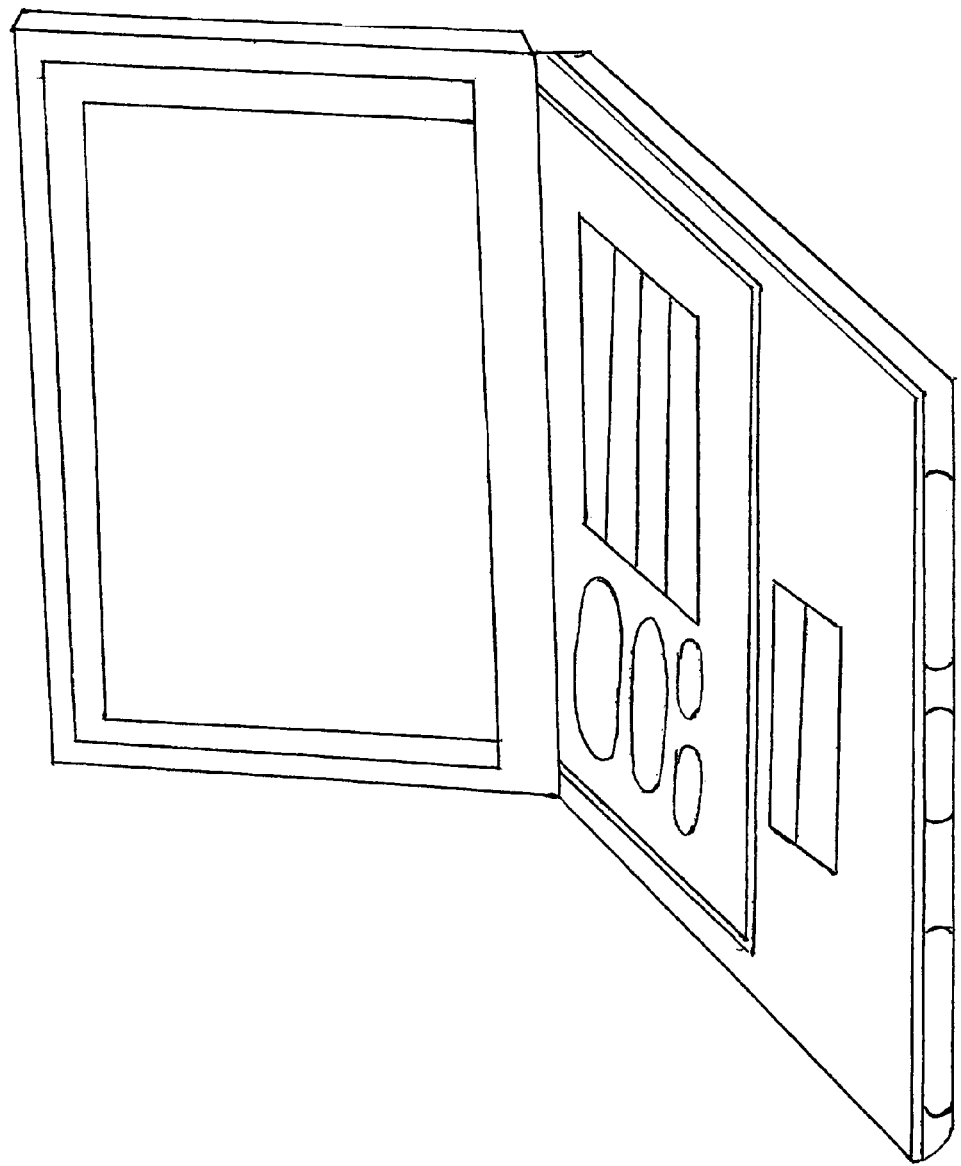
Figure 2:
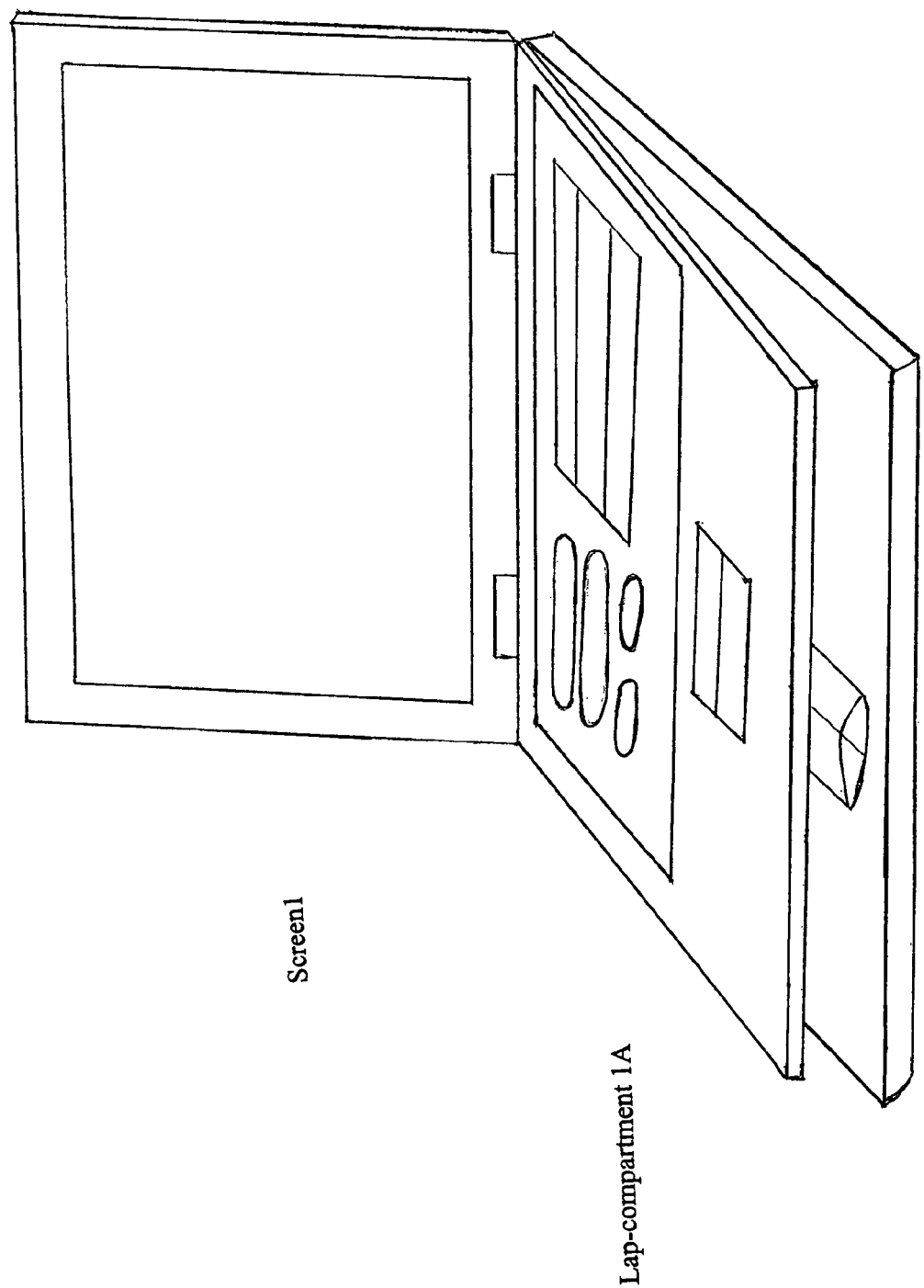

The computer is built with a unique design. The laptop is broken down into four different sections; Screen 1, Lap-compartment 1A, Screen 2, and Lap-compartment 2A. From a closed position the Invention looks exact to your everyday laptop computer. Although it holds more then the average laptop would. By pressing the release button you will open to Screen 1 and 1A. Screen 1 is your vanity mirror; part of the makeup portion of the laptop. Lap-compartment 1A is where your makeup is located. When you press the second release button you enter into Screen 2 and 2A. This is where the regular laptop is, and is equipped with your average laptop necessities. Visual demonstration of the act is in FIG. 2.

The invention claimed is:

1. A portable electronic device comprising: a display device containing a cover portion; a base hingeably connected to the display device; a first panel in correlation to the base being substantially the same size as the cover portion of the display device wherein the first panel is hingeably attached to the cover of the display device, and located to the rear of the display device, the first panel being configured to house a cosmetic compartment; a second panel in correlation to the display device being substantially the same size as the first panel wherein the second panel is hingeably attached to the first panel and located to the rear of the first panel, the second panel being configured to house a mirror; and the portable electronic device is a laptop computer.

2. The portable electronic device as recited in claim 1, wherein the base further comprises an input device.

3. The portable electronic device as recited in claim 2, wherein the input device is one of a keyboard and mouse.

4. The portable electronic device as recited in claim 1, wherein the base further comprises a processor and a memory storage device.

5. The portable electronic device as recited in claim 1, wherein the cosmetic compartment is configured to house multiple and various types of makeup and makeup applicators.

\* \* \* \* \*